United States Patent [19]
Tupper et al.

[11] Patent Number: 5,873,144
[45] Date of Patent: Feb. 23, 1999

[54] PROTECTIVE ROLL GUARD FOR CLEARING OBSTACLES FROM CASTER WHEELS

[75] Inventors: Bradley J. Tupper, Seattle; James Benson, Bellevue, both of Wash.

[73] Assignee: Innovative Research Labs, Inc., Seattle, Wash.

[21] Appl. No.: 844,574

[22] Filed: Apr. 18, 1997

[51] Int. Cl.⁶ .................................................. B60B 33/00
[52] U.S. Cl. ........................................................ 16/18 CG
[58] Field of Search ............................. 16/18 CG, 18 R, 16/2.1; 280/160; 403/344, 355, 313; 24/437, 487, 17 AP, 16 PB

[56] References Cited

U.S. PATENT DOCUMENTS

| | | |
|---|---|---|
| 601,194 | 3/1898 | Zimmerman . |
| 834,529 | 10/1906 | Madison . |
| 986,136 | 3/1911 | Carberry et al. . |
| 1,204,236 | 11/1916 | Begg . |
| 1,274,657 | 8/1918 | Zorn . |
| 2,447,582 | 8/1948 | Klumb . |
| 2,450,062 | 9/1948 | Voss et al. . |
| 2,483,241 | 9/1949 | Shepherd . |
| 2,830,545 | 4/1958 | Robinson et al. . |
| 2,996,752 | 8/1961 | Pope . |
| 3,184,783 | 5/1965 | Brigham . |
| 3,719,370 | 3/1973 | Gintick . |
| 3,818,542 | 6/1974 | Jones . |
| 4,025,099 | 5/1977 | Virden . |
| 4,176,756 | 12/1979 | Gellman ................................... 403/344 |
| 4,233,469 | 11/1980 | Steppe ........................................ 16/2.1 |
| 4,700,430 | 10/1987 | Rafterty . |
| 5,123,143 | 6/1992 | Carmack . |
| 5,134,753 | 8/1992 | Rekuc . |
| 5,170,528 | 12/1992 | Navar et al. . |
| 5,371,920 | 12/1994 | Rainville . |
| 5,385,373 | 1/1995 | Love ....................................... 403/313 |
| 5,615,450 | 4/1997 | Butler . |

FOREIGN PATENT DOCUMENTS

| | | |
|---|---|---|
| 2839344 | 3/1980 | Germany . |
| 633996 | 1/1983 | Switzerland . |

OTHER PUBLICATIONS

"MOVIT Obstacle Clearing Device Product Profile", MOVIT.

"Health Care Facilities" excerpt, *National Fire Protection Association*, National Fire Protection Association, Quincy, MA 02269, reprinted w/permission from NFPA 99–1993, pp. 99–54, 1993.

"Article 300—Wiring Methods" excerpt, *The National Electrical Code*, National Fire Protection Association, Quincy, MA 02269, reprinted w/permission from NFPA 70–1993, pp. 70–57, 1992.

"Electrical Safety Requirements for Employee Workplaces" excerpt, *The National Electrical Code*, National Fire Protection Association, Quincy, MA 02269, reprinted w/permission from NFPA 70–1993, pp. 70E–50, 1992.

"Lockout–Tagout" excerpt, *The National Electrical Code*, National Fire Protection Association, Quincy, MA 02269, reprinted w/permission from NFPA 70–1993, pp. 70E–31, 1992.

*Primary Examiner*—Chuck Y. Mah
*Attorney, Agent, or Firm*—Christensen O'Connor Johnson & Kindness, PLLC

[57] ABSTRACT

A one-piece roll guard (10) having two half segments (12, 14) connected by an integral hinge (16) for protecting a caster (100) wheel by clearing obstacles away from its rolling path. The two segments of the roll guard (10) are closed and secured together around the caster wheel with a locking tab (18*a*) and matching locking slot (18*b*) integrally formed in the two segments. The roll guard is formed with a weighted lower lip (26) to improve stability by lowering the center of gravity of the roll guard (10).

19 Claims, 5 Drawing Sheets

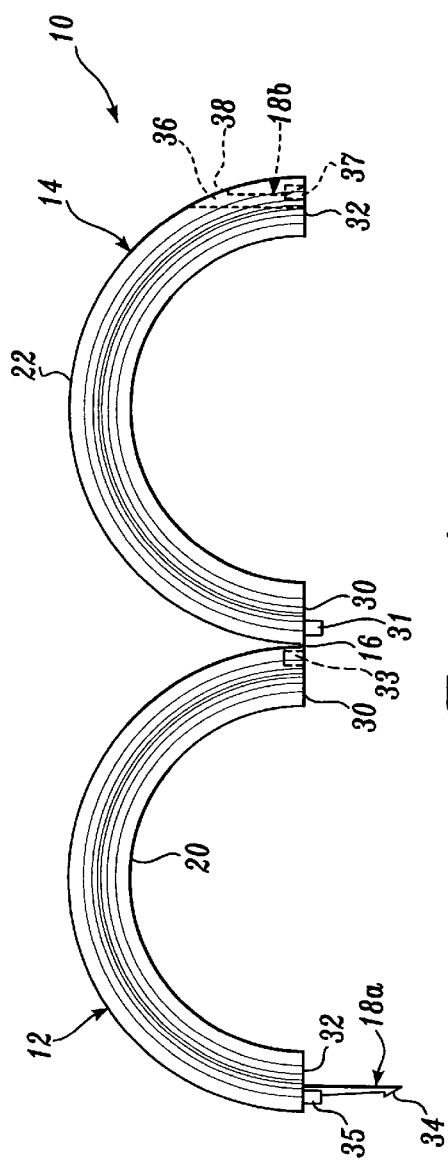
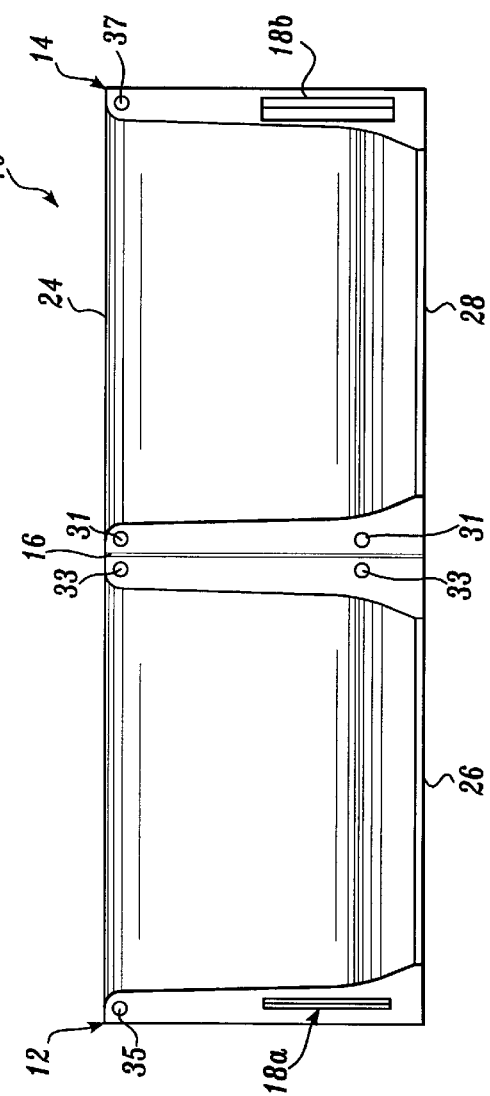
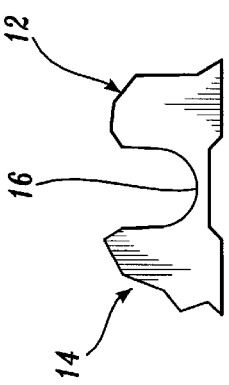

PROTECTIVE ROLL GUARD FOR CLEARING OBSTACLES FROM CASTER WHEELS

FIELD OF THE INVENTION

This invention relates to the field of roll guards or protective devices for wheels, i.e., devices intended to clear obstacles such as electrical wires, cords, tubing, etc., from the rolling path of a wheel so as to prevent obstruction of the rolling movement of the wheel.

BACKGROUND OF THE INVENTION

Modern day hospital operating room floors are cluttered with many kinds of hoses and electrical cords for such equipment as electrocardiographs, pulse oximeters, $CO_2$ monitors, and other diagnostic equipment.

Heavy anesthesia machines, usually mounted on a large cart containing devices for delivering and monitoring the administration of anesthetic to a patient, are difficult to move about through the clutter of cords and tubing. In rare instances, cart wheels may catch on tubing, accidentally disconnecting patients from breathing systems. In other instances, people have been injured when the wheels of anesthesia carts were jammed or even snapped off by the clutter of cords, causing the anesthesia machines to fall on patients and doctors.

These same difficulties can arise with caster wheeled equipment in other environments, such as mobile computer tables, mobile test equipment such as in electrical engineering environments, and for mobile industrial equipment.

One solution to this problem appears in U.S. Pat. No. 5,170,528 to Navar et al. The Navar device is a complicated arrangement, having many parts, in which a wheel is embraced within a system of rollers surrounded by an obstacle-clearing shield. One problem with the Navar device arises from the fact that it is not easily disassembled. Whenever there is a need to install or remove the device from a cart wheel, either numerous locking pins and interlocks must be installed or removed, or the heavy anesthesia cart must be lifted onto or off of the device, thereby creating a possibility for an accident to occur. Another problem posed by the Navar device arises from the system of rollers, which may pick up dirt, hair, or other debris. Debris in the rollers creates the potential for jamming the rollers, thereby transforming the obstacle-clearing device of Navar into the very obstacle that the device was meant to clear.

An additional obstacle clearing device which has been utilized consists of a simple cylindrical tubular shield which is cut from a length of plastic pipe. However, because of the solid, non-jointed nature of this shield, the entire anesthesia cart must be lifted to place or remove the shield around a wheel. Installation and removal thus presents risk of back injury or tipping of the machine.

SUMMARY OF THE INVENTION

The present invention is directed to a roll guard for caster wheels. The inventive roll guard is of a generally cylindrical shape, and extends vertically from the floor surface up to a height near the point where the caster wheel is connected to a cart. The roll guard is manufactured as a single piece unit having two segments connected by an integral hinge. The hinge allows for the two segments of the roll guard to be opened or closed around the caster wheel, thereby allowing for the fitting or removal of the roll guard to a caster wheel without having to lift or move the cart. Additionally, the two segments of the roll guard are formed with integral lock elements which allow for the two segments of the roll guard to be joined into a rigid unit.

The roll guard may additionally be formed with a weighted lower lip, which lowers the center of gravity of the roll guard, thereby increasing its stability.

BRIEF DESCRIPTION OF THE DRAWINGS

The foregoing aspects and many of the attendant advantages of this invention will become better understood by reference to the following detailed description, when taken in conjunction with the accompanying drawings, wherein:

FIG. 4 is a top view of the roll guard of FIG. 1 in the fully open position, showing the integral hinge and lock elements formed in each segment of the roll guard.

FIG. 5 is a side view of the roll guard of FIG. 1 in the fully open position, showing the edges of the segments of the roll guard, the integral hinge, and the integral lock elements formed in the segments of the roll guard.

FIG. 6 is a cutaway top view of the integral hinge of the roll guard of FIG. 1.

DETAILED DESCRIPTION OF THE PREFERRED EMBODIMENT

Figure 1:
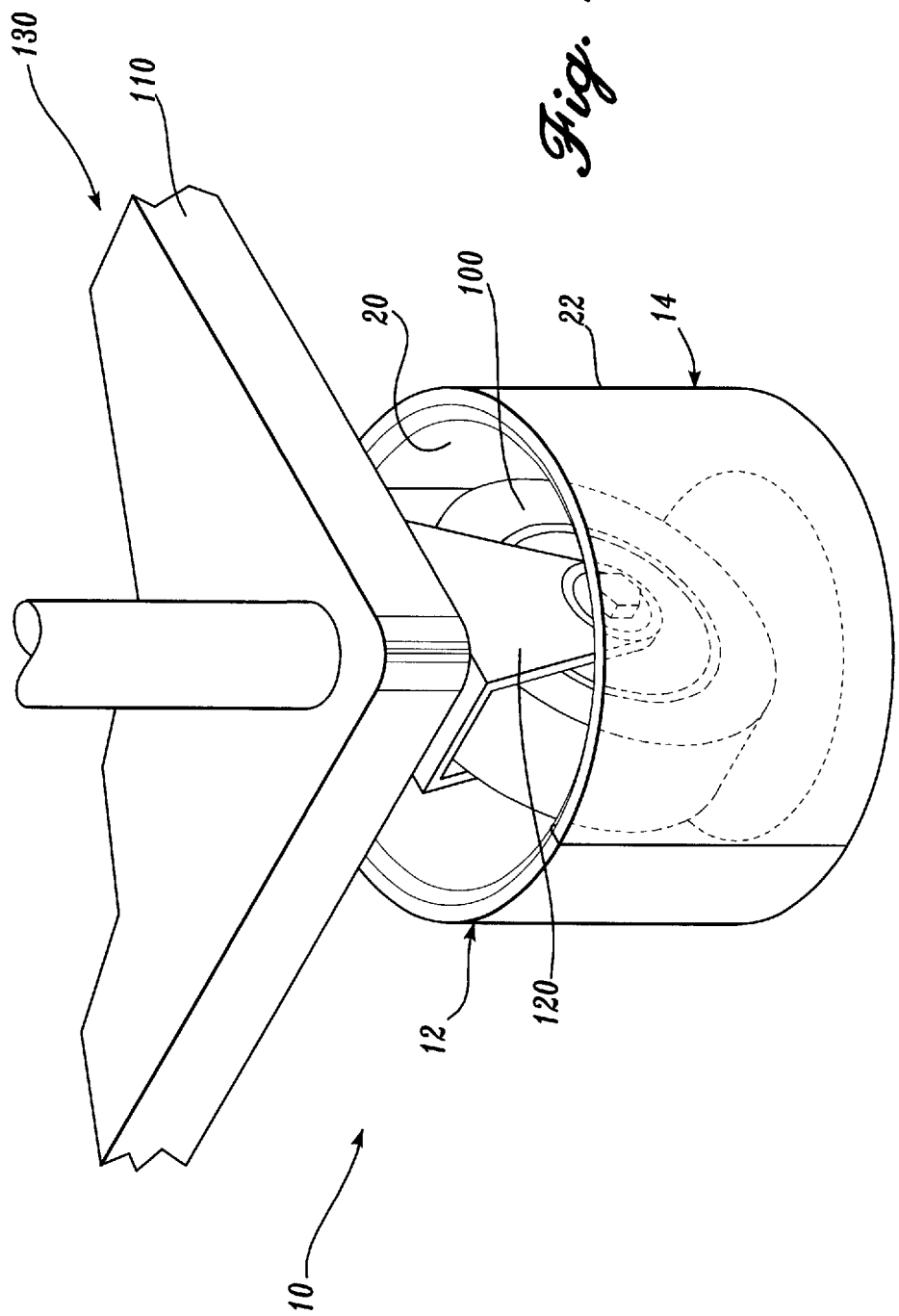
FIG. 1 is a perspective view of a roll guard according to a first preferred embodiment of the present invention, fitted around a typical cart-mounted caster wheel.

A roll guard 10 according to the present invention essentially forms a protective sleeve around a caster wheel 100 when the roll guard is fitted in place around the caster wheel. FIG. 1 depicts a typical caster wheel 100 connected to a support member 120 and lower tray 110 of a cart 130. Surrounding the caster wheel 100, and resting on the floor is a first preferred embodiment of a roll guard 10 according to the present invention.

Figure 2:
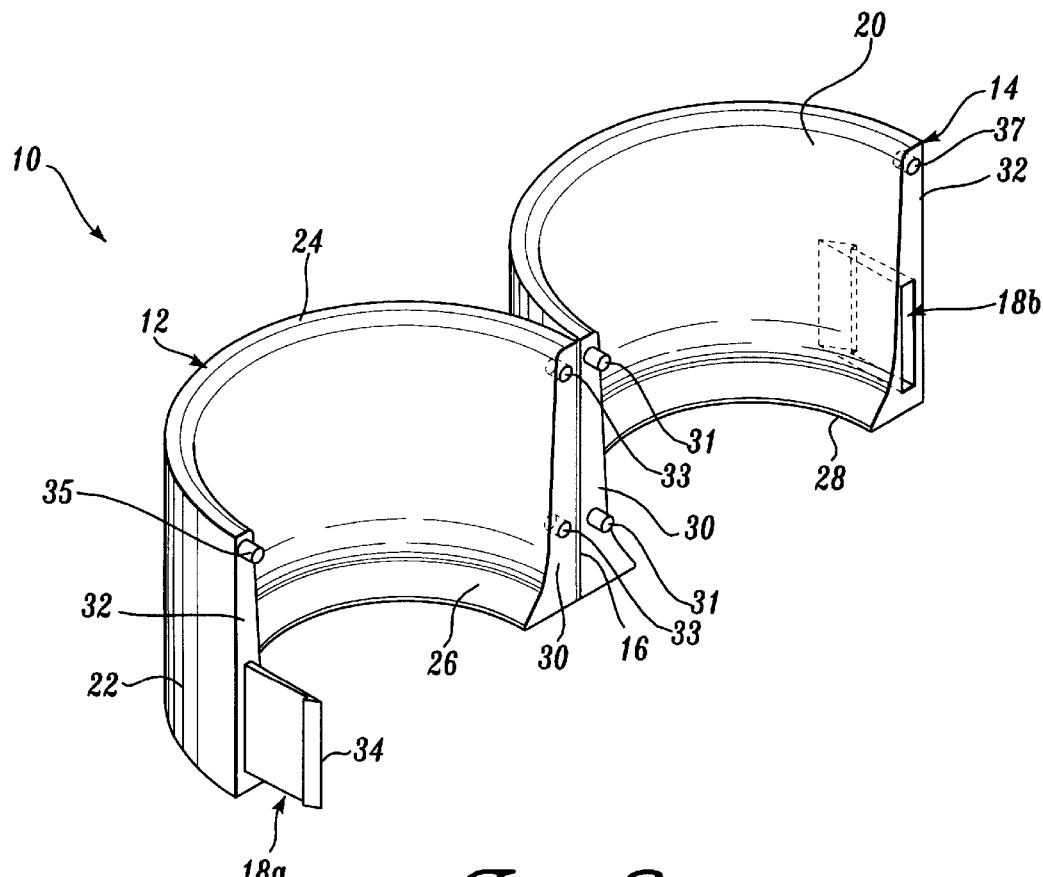
FIG. 2 is a perspective view of the roll guard of FIG. 1 in the fully open position, sewing the integral hinge and lock elements formed in each segment of the roll guard.

The roll guard 10 is formed from a first semi-cylindrical half segment 12 joined to a second semi-cylindrical half segment 14 by a longitudinally oriented integral hinge 16 (FIGS. 1 and 2). The half segments 12 and 14 are connected in opposing disposition by the hinge 16, which joins first adjacent longitudinal edges of the half segments 12, 14. Second adjacent longitudinal edges of the half segments 12, 14 include integral locking elements 18. The half segments 12, 14 are movable relative to each other, by flexing the hinge 16, between an open configuration (FIG. 2) and a closed, cylindrical sleeve configuration (FIG. 1), in which configuration they are selectively secured by the locking elements 18. In the closed configuration, the roll guard 10 surrounds and clears obstacles from the caster wheel 100. When the cart is moved, the caster wheel 100 pushes against an inner wall 20 of the roll guard 10, causing the roll guard 10 to slide along the floor with the caster wheel 100. An outer wall 22 of the roll guard 10 precedes the wheel, thereby pushing any obstacles out of the way. The roll guard 10 is formed from a material sufficiently rigid to withstand deformation from repeated encounters with both a rolling caster wheel and a variety of different obstacles that may be encountered. Additionally, the roll guard 10 material should be chosen and finished so as to reduce frictional resistance from the floor and from the rolling caster wheel. Preferred materials include thermoplastic polymers, as shall be described subsequently, but thermosetting polymers and metals may alternately be utilized, In the illustrated preferred embodiment of the present invention, the roll guard 10 is generally cylindrical in shape. When fitted in place around the caster wheel 100, the central axis of the cylindrical roll guard 10 is generally perpendicular with both the plane of the floor and with the rotational axis of the caster wheel (which will be generally parallel to the plane of the floor). The height of the roll guard 10 is determined so as to provide sufficient protection to the caster wheel, while still being low enough as to avoid interference with the lower tray of the cart. As shown in FIG. 1, the height of the roll guard 10 preferably exceeds the height of the caster wheel in order to reduce the chance of the roll guard 10 tipping over. The minimum inside diameter inner wall 20 of the roll guard 10 is slightly larger than the diameter of the caster wheel such that the caster wheel may rotate about its axis of rotation and swivel relative to support member within the roll guard 10. Likewise, the roll guard 10 can freely rotate about and relative to the caster wheel which it surrounds.

The roll guard 10 of the preferred embodiment is molded, machined or otherwise formed as a single unitary piece. In the closed configuration of FIGS. 1 and 3, the roll guard 10 defines a smooth, straight, vertical outer wall 22 and a substantially flat upper edge 24 which is beveled along its juncture with the inner wall 20 of the roll guard 10. The inner wall 20 is smooth and substantially straight, like the outer wall 22 but slants slightly inwardly, toward the central axis of the roll guard 10.

The lower quarter to third of the inner wall 20 of the roll guard 10 flares in toward the central axis of the roll guard 10 to form a weighted internal lip 26 for reducing the center of gravity of the unit, thereby increasing stability. The lip 26 is formed such that the lip 26 does not interfere with the movement of the caster wheel. The roll guard 10 has a circular bottom edge 28 joining the inner and outer walls 20, 22 of the roll guard 10 that provides a substantially flat and smooth sliding surface.

Those skilled in the art will recognize that other overall shapes for the roll guard 10 may be utilized within the scope of the present invention. For example, the roll guard 10 could define an oval or rectangular tube, rather than a circular tube. Further, the weighted lip 26 could be eliminated or formed on the outer wall 22, and sizes, as well as other weighted lip arrangements, such as lips extending outward, without departing from the spirit of the present invention.

Referring to FIGS. 2–6, the preferred embodiment of the roll guard 10 according to the present invention is formed by casting or molding the roll guard as a single, integral unit, a portion of which forms a first half segment 12, another portion of which forms a second half segment 14, and a further portion defining the integral hinge 16 joining the two half segments 12, 14. The hinge 16 is preferably formed as a very thin section of the roll guard material (FIG. 6) that is integrally cast or molded between the two segments 12, 14. When the roll guard 10 opens or closes by moving the half segments 12, 14 relative to each other, the material of the resulting "living" hinge 16 bends, undergoing plastic deformation. To avoid failure of the hinge 16 due to repeated opening and closing, the interfaces between the hinge 16 and either half segments 12, 14 is formed as a fillet to avoid stress points which might increase the likelihood of cracking or tearing.

To further protect the hinge 16 from damage, support pins 31 and corresponding support recesses 33, and an alignment peg 35 and corresponding alignment receptacle 37 are provided in longitudinal edges 30 and 32, respectively. When the roll guard 10 is in the closed position, support pins 31 interlock with corresponding support recesses 33, and alignment peg 35 interlocks with corresponding alignment receptacle 37 to prevent the two half segments from moving relative to each other, thereby reducing stress on the hinge 16. While two sets of support pins and corresponding support recesses, 31 and 33 respectively, are depicted, with both support pins 31 being located in the second half roll guard 14 and both corresponding support recesses 33 being located in the first half roll guard 12, it is noted that the number of corresponding support pins 31 and support recesses 33 could be more or less, and the disposition of support pins 31 and corresponding support recesses 33 in the first and second half roll guards, 12 and 14 respectively, could be varied without departing from the spirit of the invention.

Additionally, because the roll guard 10 of the preferred embodiment is formed as a single unit, the thin section of material that forms the hinge 16 must be resilient enough to withstand repeated deformations from opening and closing the roll guard 10 without breaking or tearing. A preferred material is a resilient thermoplastic polymer which is relatively rigid in thick sections, and resiliently compliant in thin sections. Suitable materials include polypropylene or a polyamide, (i.e., nylon). Those skilled in the art will recognize that the preferred embodiment may alternatively be constructed from two separate half segments 12, 14 joined by a permanently attached hinge (not shown), such as piano hinges, pivot pins, or nylon straps attached with screws, nails, rivets, adhesives, or in any other manner. However, integral formation of the hinge 16 with the two half segments 12, 14 is preferred due to simplicity and cost considerations.

Figure 3:
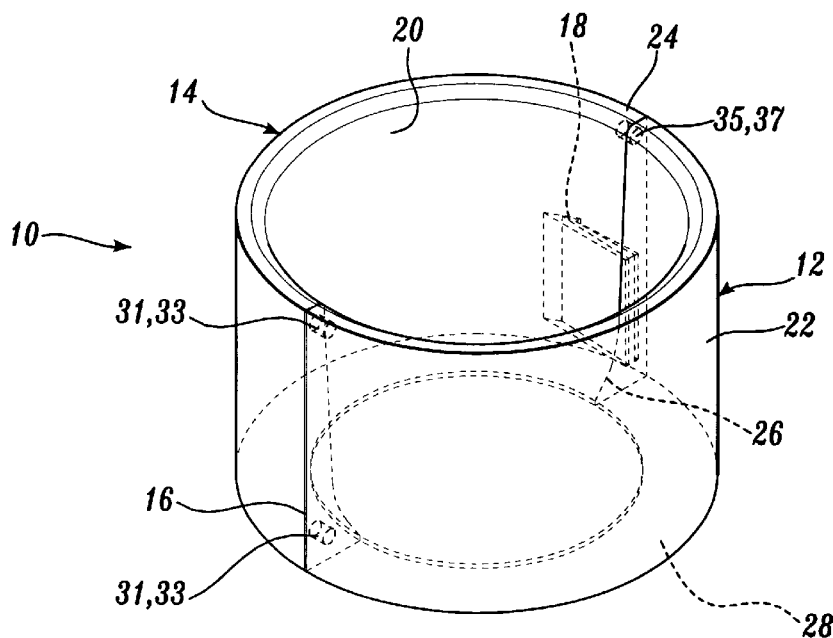
FIG. 3 is a perspective view of the roll guard of FIG. 1 in the closed position showing the integral hinge, and the interlocking of the integral lock elements.

FIGS. 2, 4 and 5 depict the preferred roll guard 10 in the fully open configuration for installation and removal, (i.e., where hinge 16 is in its normal, or non-deformed state), as is also shown in FIG. 6. In this position, it can be seen that the preferred embodiment of the roll guard 10 is formed of two semi-circular half-cylindrical half segments 12, 14 sitting side-by-side. The longitudinal edges of each semi-cylindrical half segments 12, 14 are preferably flat and perpendicular to the floor and oriented radially relative to a central axis of each half segment 12, 14. A first longitudinal edge 30 of each half segment 12, 14 is joined along the radially oriented extremity by the integral hinge 16. A second longitudinal edge 32 of each half segment 12, 14 is spaced far apart in the open configuration (FIGS. 2 and 4) and adjacent each other in the closed configuration (FIGS. 1 and 3). In the closed configuration, the edges 30 contact each other and the edges 32 contact each other in opposing disposition.

The locking elements 18 are preferably integrally formed on the second edge 32 of each half segment 12, 14 in opposing disposition for automatic engagement when the half segments 12, 14 are moved to the closed configuration. In the preferred embodiment illustrated, the second edge 32 of the first half segment 12 includes a locking tab 18a projecting normally from the second edge 32, i.e., in a direction tangential relative to the cylindrical shape of the closed roll guard 10. The locking tab 18a is configured generally as a flat flange, and engages with a corresponding locking slot 18b defined within the second edge 32 of the second half segment 14, as will be described subsequently. The locking tab 18a and locking slot 18b cooperatively form the integral locking elements 18.

Referring to FIG. 2, the locking tab 18a extends from just above the bottom edge 28 of the roll guard 10, one quarter to one third along the height of the roll guard, and has a thickness of one sixth to one quarter the width of the end. As depicted in FIG. 4, the locking tab 18a is preferably located approximately one quarter the distance from the outer wall 22 to the inner wall 20. The thickness of the locking tab 18a gradually tapers from the second edge 32 of the first half segment 12, terminating in an enlarged catch 34 formed along the extreme longitudinal edge of the locking tab 18a. The catch 34 is wider than the adjacent portion of the locking tab 18a, forming an outwardly extending hook when viewed along the longitudinal axis of the roll guard 10. The width of the catch 34 at its broadest point is preferably the same as the width of the base of the locking tab 18a as it projects from the edge 32.

The integral rectangular locking slot 18b formed within the second half segment 14 of the roll guard 10 is contoured correspondingly to the locking tab 18a in the first half segment 12. The locking slot 18b thus forms a rectangular aperture in the second edge 32 of the second half segment 14, extending normally from the second edge 32 into the interior of the second half segment 14. The extreme end of the locking slot 18b expands in width to define an aperture 36 in the outer wall 22. The locking slot 18b defines a shoulder 38 adjacent the aperture 36, which receives and retains the catch 34 when the locking tab 18a is fully inserted into the locking slot 18b. Specifically, as the first and second half segments 12, 14 are joined, the catch 34 of the locking tab 18a enters the locking slot 18b. The catch 34 rides along the interior of the locking slot 18b, causing the locking tab 18a to resiliently flex along its length. As the roll guard 10 is fully closed, the catch 34 reaches the shoulder 38, and the locking tab 18a snaps resiliently back to its unflexed configuration. When the first and second half segments 12, 14 are in the closed position, as shown in FIG. 3, the locking tab 18a is received and is lockably engaged in the locking slot 18b, and the catch 34 engages with the shoulder 38 to prevent removal of the locking tab 18a from the locking slot 18b, thereby securing the two half segments 12, 14 together.

As shown in FIG. 4, the locking slot 18b is preferably tapered inwardly at the entrance of the locking slot 18b to permit the locking tab 18a to be more easily inserted, as well as to allow for manufacturing tolerances and possible deformations from prolonged use. Additionally, the base of the locking tab 18a may be provided with a ramp (not shown) which corresponds to the taper in the locking slot 18b such that locking tab 18a and locking slot 18b are in contact with each other for the full length of the locking tab 18a when the roll guard 10 is closed, thereby providing additional support for the structure and reducing possible stresses on the hinge 16. After assembly to the locked configuration, the catch 34 of the locking tab 18a can be accessible through the aperture 36 in the outer wall 22 of the second half segment 14, in order to facilitate manual depression of the locking tab 18a to permit selective unlocking of the first and second half segments 12, 14.

Those skilled in the art will recognize that other forms of integral locking mechanisms than the tab and slot arrangement of the preferred embodiment may be employed without departing from the spirit of the present invention. Specifically contemplated alternative embodiments include a locking tab with pawl-like teeth engaging a locking slot or recess with one or more locking ridges (not shown), and a locking post and ball arrangement inserted into a corresponding receptacle having a slightly smaller entry diameter than the ball (not shown). Regardless of the exact formation, the locking mechanism is integrally formed and preferably automatically engaged for simplicity and reliability.

Figure 7:
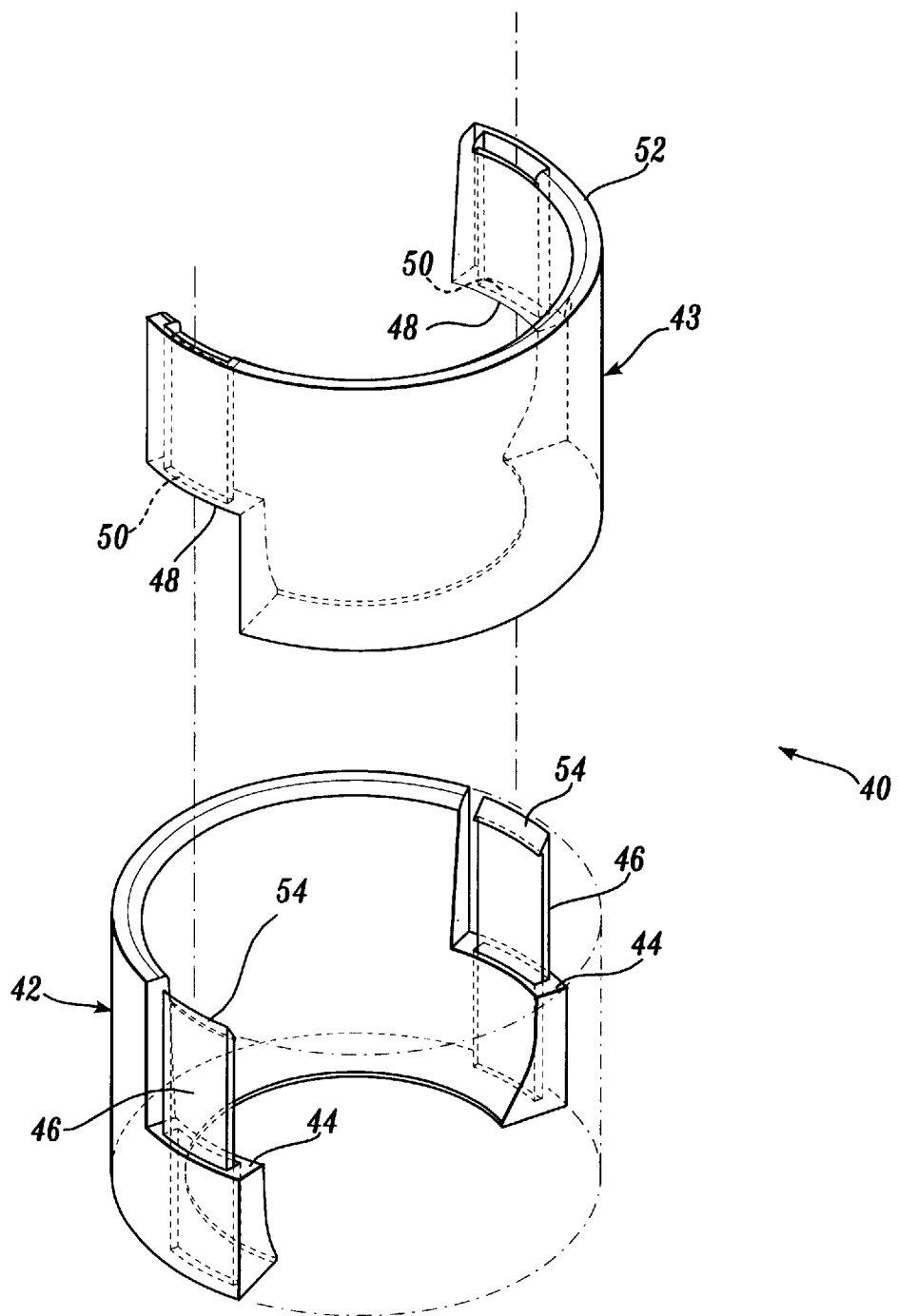
FIG. 7 is a perspective exploded view of a first alternative embodiment of the present invention The roll guard is formed of two separate pieces, and the integral lock elements are vertically extending tabs and slots.

FIG. 7 depicts a first alternative embodiment of a roll guard 10 constructed in accordance with the present invention. In this embodiment, the two semi-cylindrical half segments 42, 43 are formed as two separate pieces. Instead of including an integral hinge, each longitudinal edge of the segments 42, 43 includes a locking mechanism. Specifically, the longitudinal edges of the first half segment 42 is formed stepwise to define two horizontally disposed lower shoulders 44. Each horizontally disposed lower shoulder 44 includes an integral locking tab 46. Each locking tab 46 is configured the same as the locking tab 18a of the roll guard 10, except that the locking tabs 46 extend longitudinally, i.e., vertically, rather than horizontally.

The second half segment 43 has longitudinal edges which are stepped inversely and corresponding to the first half segment 42, thus defining corresponding upper shoulders 48. Each upper shoulder 48 defines a locking slot 50. Each locking slot 50 is contoured corresponding to the locking slot 18b of the roll guard 10, except that the locking slots 18b extend longitudinally, i.e., vertically, and over onto the tope edge 52 of the half segment 43. Additionally, the locking tabs 46 and locking slots 50 of the roll guard 40 are preferably formed arcuately, curving slightly about the longitudinal axis of the roll guard 40. The completed roll guard 40 is formed by sliding the second half segment 43 down atop the first half segment 42, such that upper shoulders 48 rest on lower shoulders 44, respectively, and locking tabs 46 are inserted into locking slots 50. In this closed configuration, half segments 42, 43 are locked together to define a complete cylinder. In the preferred embodiment, the upper catch ends 54 of the locking tabs 46 are accessible through the top edge 52 of the second half segment 43 in order to facilitate selective unlocking of the roll guard 40.

Figure 8:
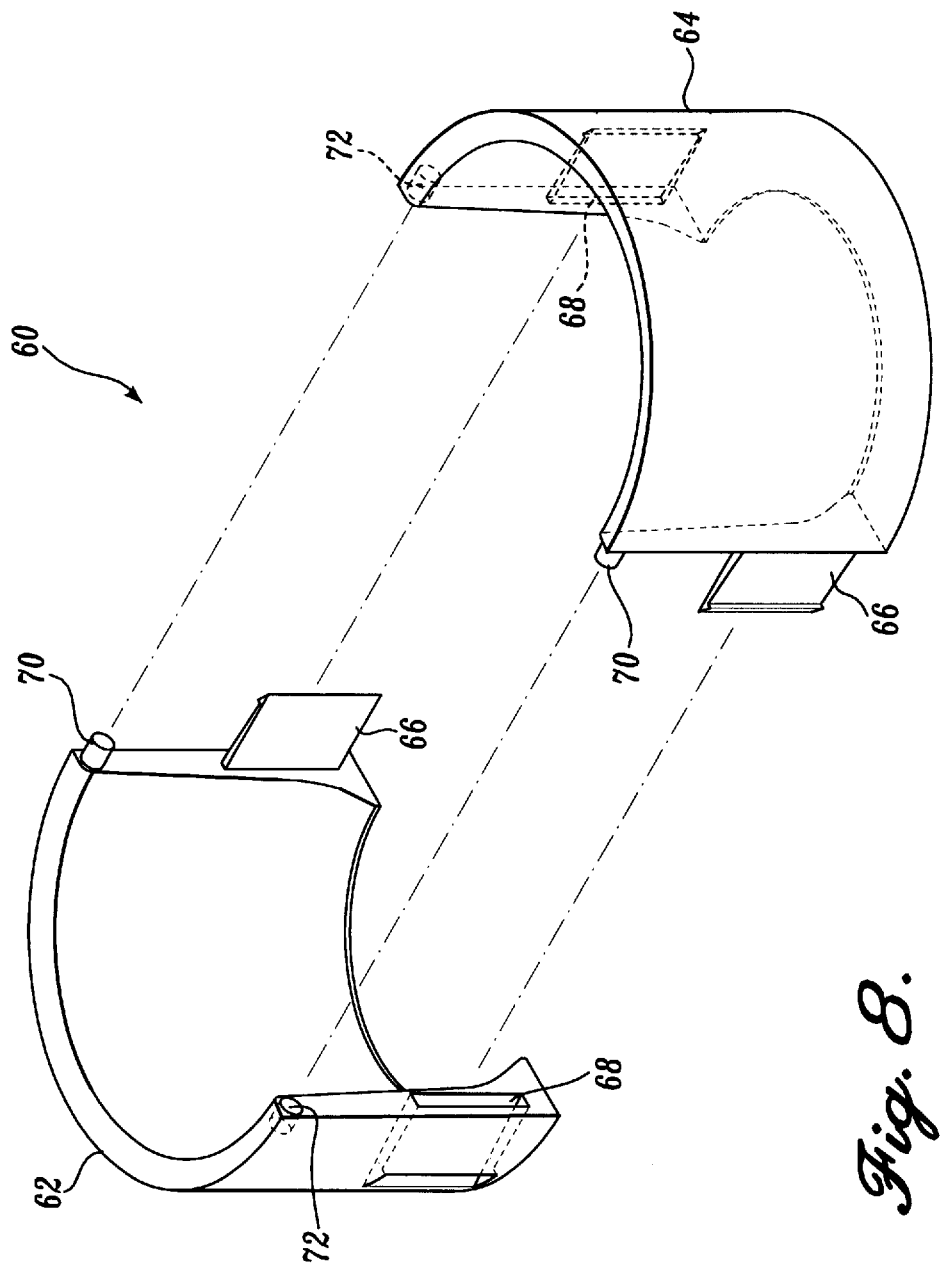
FIG. 8 is a perspective view of a second alternative embodiment of the present invention. The roll guard is formed from two separate segments, and the integral lock elements are formed as horizontally extending tabs and slots. Additionally, integral pegs and sockets are formed in the segments of the roll guard to aid in aligning the segments for closure.

FIG. 8 depicts a second alternative embodiment of a roll guard 60 constructed in accordance with the present invention. The complete roll guard is formed of two separate half segments 62, 64. Each half segment 62, 64 is preferably a semicircular half-cylinder and is the mirror image of the other, in order to reduce manufacturing costs. The roll guard 60 is identical to the previously described roll guard 10, except that the half segments 62 and 64 are separately formed, and there is no integral hinge. Two sets of locking elements are instead provided.

Specifically, each half segment 62, 64 includes a horizontally extending integral locking tab 66 on one longitudinal edge, and a matching locking slot 68 formed within the other longitudinal edge. The locking tabs 66 and locking slots 68 are otherwise configured and located as they would be in the preferred roll guard of FIGS. 1–5. The complete roll guard is formed by inserting the locking tabs 66 of the two mirrored half segments into the corresponding locking slots 68 of the other mirrored half segments in locking engagement. Additionally, to facilitate alignment, each half segment 62, 64 is fitted with an alignment peg 70 spaced above the locking tab 66, and a corresponding alignment receptacle 72. The alignment peg 70 of each half segment 62, 64 is slidably received within the corresponding alignment receptacle 72 to longitudinally stabilize the two half segments when locked.

Alternate embodiments of roll guards 40 and 60 share in common with the preferred roll guard 10 the integral formation of locking elements that enable selective automatic locking of roll guard segments without the need to assemble separate pins, screws, bolts or other hardware. The roll guard 10 is the most preferred embodiment because of the inclusion of an integral hinge; but all are within the scope of the present invention. Other alternatives are also within the scope of the present invention. For example, while each of the embodiments described above utilizes semi-cylindrical (i.e., 180°) segments, the segments need not match in size, just so that the roll guard may be removed from the caster wheel in the open configuration without the need of lifting the caster wheel. Thus, one segment could be greater than 180°, with the other less than 180°, while still being within the scope of the present invention.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A roll guard apparatus for use with a caster wheel to clear obstacles away from a rolling path of the caster wheel along a floor, the apparatus comprising:
   a first sleeve portion positionable to be supported on the floor and to partially encircle the caster wheel, the first sleeve portion having a first lock element integral with the first sleeve portion; and
   a second sleeve portion being positionable to be supported on the floor and to partially encircle the caster wheel, the second sleeve portion having a second lock element integral with the second sleeve portion; wherein:
   the first sleeve portion and the first lock element are formed as a single unit;
   the second sleeve portion and the second lock element are formed as a single unit; and
   the second lock element selectively engages the first lock element to releasably interlock the first and second sleeve portions into a sleeve which completely encircles the caster wheel.

2. A roll guard apparatus for use with a caster wheel to clear obstacles away from a rolling path of the caster wheel along a floor the apparatus comprising:
   a first sleeve portion positionable to be supported on the floor and to partially encircle the caster wheel, the first sleeve portion having a first lock element integral with the first sleeve portion; and
   a second sleeve portion being positionable to be supported on the floor and to partially encircle the caster wheel, the second sleeve portion having a second lock element integral with the second sleeve portion; wherein:
   the second lock element selectively engages the first lock element to releasably interlock the first and second sleeve portions into a sleeve which completely encircles the caster wheel; and
   the first lock element comprises at least one tab and the second lock element comprises at least one corresponding surface ridge, the tab being insertable past the corresponding surface ridge for selective locking engagement therebetween.

3. The apparatus of claim 2, wherein the second sleeve portion is permanently hinged to the first sleeve portion.

4. The apparatus of claim 3, wherein the second sleeve portion is formed integrally with the first sleeve portion, such that the first and second sleeve portions are coupled by an integral hinge and are hingedly movable with respect to each other.

5. The apparatus of claim 4, wherein the first and second sleeve portions and integral hinge comprise a one-piece member constructed of a thermoplastic polymer material.

6. The apparatus of claim 2, wherein the tab of the first lock element defines a stop protuberance for engaging the corresponding surface ridge of the second lock element.

7. The apparatus of claim 6, wherein the second sleeve portion defines a slot, the surface ridge is formed within the slot, and the tab of the first sleeve portion is insertable into the slot for selective locking.

8. The apparatus of claim 1, wherein the lower portion of the sleeve further comprises a weighted lip formed around an edge of the sleeve, and in contact with the floor.

9. The apparatus of claim 8, wherein the weighted lip flares inwardly toward the caster wheel when the apparatus encircles the caster wheel.

10. The apparatus of claim 2, wherein the first and second sleeve portions define corresponding first and second shoulders, respectively, that abut each other upon locking, and wherein the first lock element comprises a first vertical tab extending from the first shoulder that engages a first surface ridge defined adjacent the second shoulder.

11. The apparatus of claim 10, wherein the first and second sleeve portions further define corresponding third and fourth shoulders, respectively, that abut each other upon locking, and wherein the first lock element further comprises a second vertical tab extending from the third shoulder that engages a second surface ridge defined adjacent the fourth shoulder.

12. The apparatus of claim 11, wherein the second lock element comprises first and second vertical slots corresponding to the first and second vertical tabs, the first and second vertical slots being defined in the second and fourth shoulders formed by the second sleeve portion, respectively, the first and second vertical tabs being selectively receivable with the first and second vertical slots, respectively, in locking engagement, such that the first and third shoulders of the first sleeve portion cooperate with the second and fourth shoulders of the second sleeve portion to form the sleeve.

13. The apparatus of claim 12, wherein the first, second, third and fourth shoulders are horizontally disposed.

14. The apparatus of claim 2, wherein the first lock element comprises a first horizontal tab extending from a first end of the first sleeve portion, and wherein the second lock element comprises a first horizontal slot defined in a first end of the second sleeve portion, the first horizontal tab being receivable within the first horizontal slot to lock the first and second sleeve portions.

15. The apparatus of claim 14, wherein the first lock element further comprises one of a second horizontal tab and a second horizontal slot, and wherein the second lock element further comprises the other of a second horizontal tab and a second horizontal slot, the one of the second horizontal tab or slot extending from or being defined in a second end of the first sleeve portion, and the other of the second horizontal slot or tab being defined in or extending from a second end of the second sleeve portion, for selective locking engagement therebetween.

16. The apparatus of claim 15, further comprising at least one alignment pin protruding from one of the first and second sleeve portions that is engageable with a corresponding alignment aperture defined in the other of the first and second sleeve portions.

17. The apparatus of claim 1, wherein the sleeve portions cooperatively comprise a cylindrical shell, and the first and second sleeve portions comprise semi-cylindrical shells.

18. The apparatus of claim 1, wherein the sleeve portions are configured such that the interlocked sleeve portions can freely rotate about the encircled caster wheel.

19. A roll guard apparatus for use with a caster wheel to clear obstacles away from a rolling path of the caster wheel along a floor, the apparatus comprising:

a first sleeve portion positionable to be supported on the floor and to partially encircle the caster wheel;

a second sleeve portion being positionable to be supported on the floor and to partially encircle the caster wheel; and a hinge portion permanently hingedly coupling the first sleeve portion to the second sleeve portion; wherein the first sleeve portion, the second sleeve portion, and the hinge portion are formed integrally, as a single unit, the hinge portion being disposed between the first and second sleeve portions such that the first and second hinge portions pivot about the hinged portion to open and close around the caster wheel.

* * * * *